Aug. 30, 1966   M. O. HOLTAN   3,269,217
TRANSMISSION-DIFFERENTIAL UNIT
Filed Sept. 6, 1963   4 Sheets-Sheet 1

INVENTOR.
MAURICE O. HOLTAN
BY
ATTORNEY

INVENTOR.
MAURICE O. HOLTAN
BY Miles Henninger
ATTORNEY

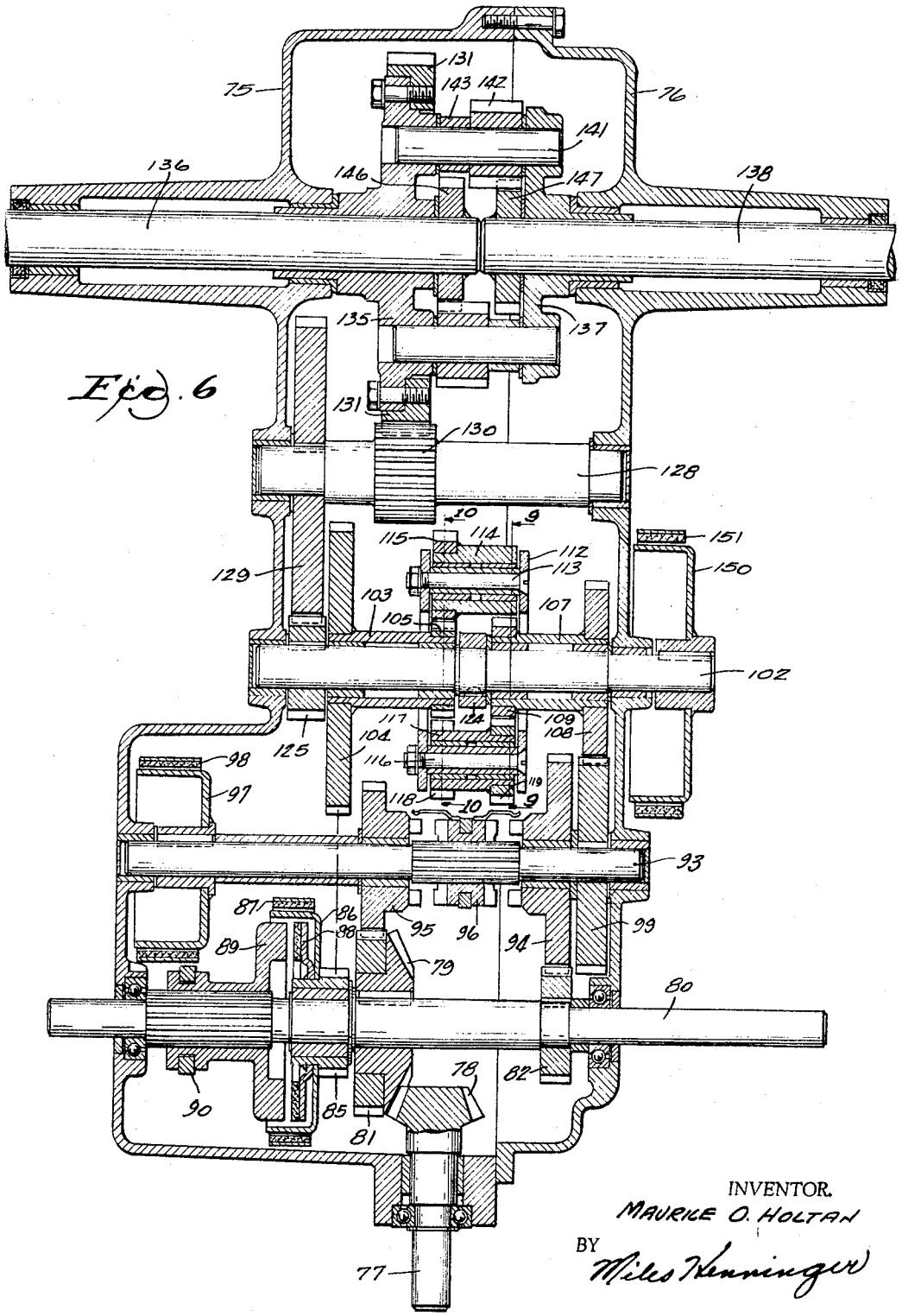

Aug. 30, 1966  M. O. HOLTAN  3,269,217
TRANSMISSION-DIFFERENTIAL UNIT
Filed Sept. 6, 1963  4 Sheets-Sheet 4
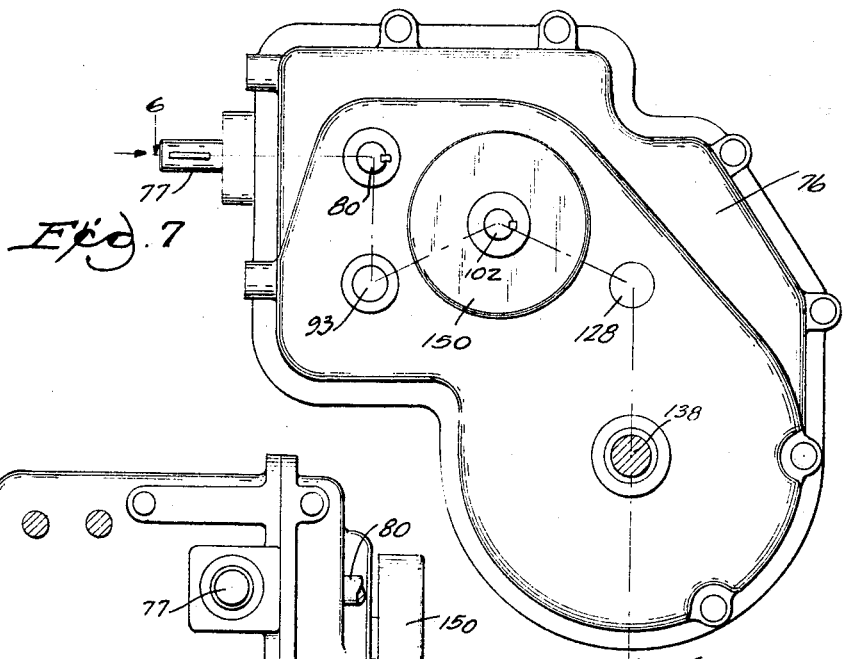
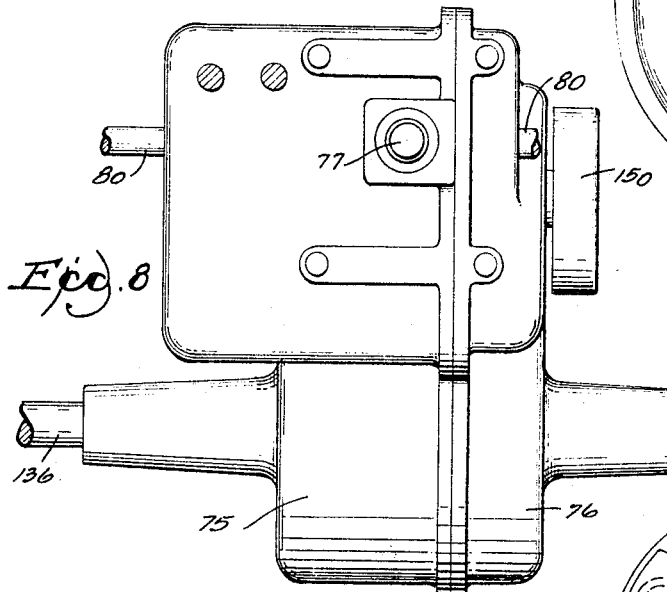
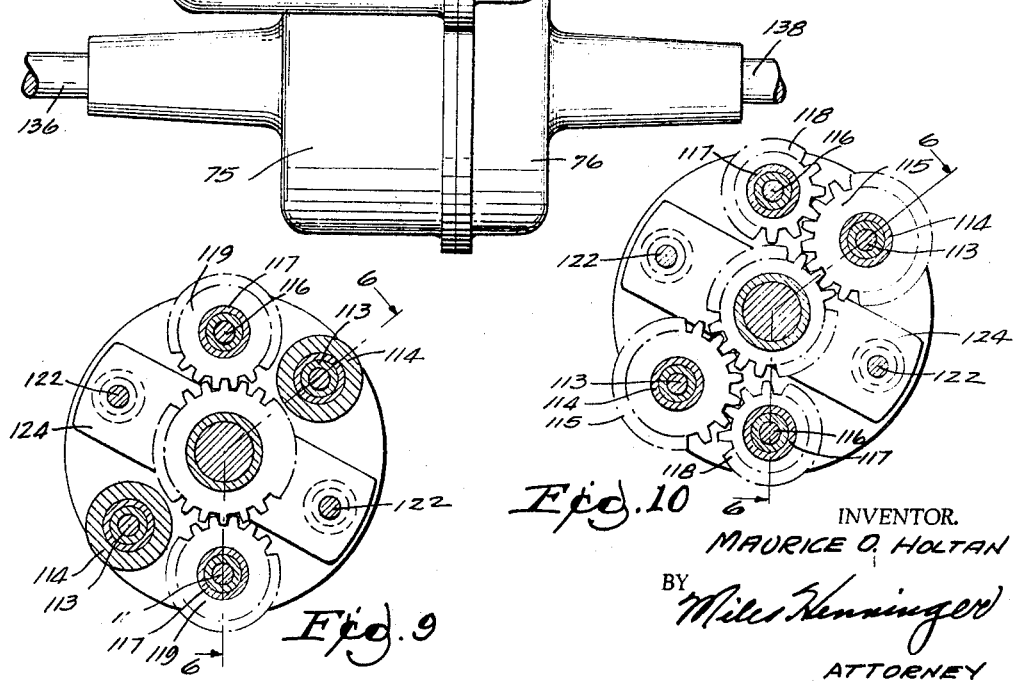
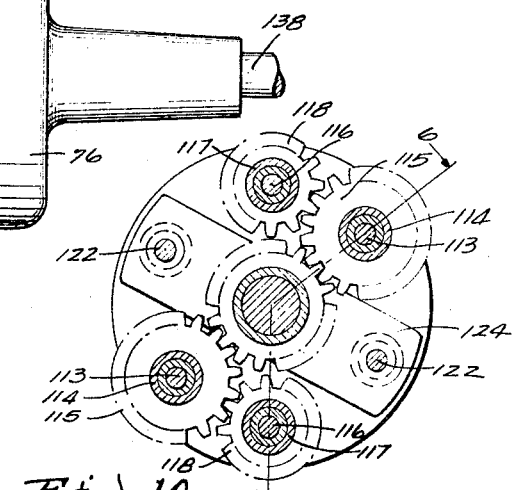
INVENTOR.
MAURICE O. HOLTAN
BY Miles Henninger
ATTORNEY United States Patent Office 3,269,217
Patented August 30, 1966

1

3,269,217
TRANSMISSION-DIFFERENTIAL UNIT
Maurice O. Holtan, 2013 Menomonee River Parkway,
Wauwatosa, Wis.
Filed Sept. 6, 1963, Ser. No. 307,214
7 Claims. (Cl. 74—705)

This invention relates to improvements in gearing combining into a single unit both a speed changing-reversing transmission and a differential for the axles of a pair of vehicle drive wheels.

In light duty, utility vehicles such as small trucks, golf carts, garden tractors and the like, it is desired to provide simple and compact transmission-axle units which provide a number of forward speeds and a reverse speed and which include differential gearing for driving a pair of axles. Because most automobiles now have automatic transmissions, many persons are not familiar with the operation of a clutch as part of speed changing procedure and such gearing should be constantly in mesh to permit shifting to higher or lower speed under load at any time. The present transmission-axle (transaxle) performs or functions like an automatic transmission except that it will not automatically shift from one speed to another. The mechanism involves planetary gearing, clutches and brakes. If the various functions in such transmission and differential are separated into different sub-assemblies, relatively simple and cheap structures can be utilized which are readily maintained and which may be replaced at moderate cost. All of the gears in such unit may be the usual spur gears and there can be a minimum of shifting parts which require splining or similar machining operations.

Generally, the present embodiments of the invention each provide a casing with pairs of aligned apertures for reception of rotatable shafts each forming a part of one sub-assembly. Thus, an input sub-assembly includes a shaft on which two fixed gears of different size severally mesh with gears of a second sub-assembly, and a gear rotatable on the shaft meshes with another gear which is a side gear of a planetary speed changing sub-assembly. A brake in the input sub-assembly may hold the rotatable gear against movement and a clutch in such sub-assembly may connect the rotatable gear with the shaft. A second sub-assembly includes a shaft with two gears rotatable thereon and of different size, which may be alternately clutched to the shaft and which mesh severally with the gears fixed on the input shaft. A third gear is fixed on the second side-assembly shaft and meshes with another side gear of the speed changing sub-assembly.

The two side gears of the planetary speed changing sub-assembly may be of different size and are severally fixed on sleeves which are rotatable on a shaft and which severally have a sun gear at an end of each sleeve. A carrier is fixed to and rotates with the shaft and rotatably supports plural planet assemblies each having a pinion meshing with a sun gear. A relatively small gear fixed on the shaft of the planetary speed changer, is part of a speed reducing gearing which delivers power to a differential sub-assembly drive joining the axles of the pair of driving wheels. The differential sub-assembly includes a carrier of two flange-like parts severally rotatable in the casing and rotatably supporting the axles, and which flanges are joined by at least two planet sub-assemblies severally having a planet gear meshing with one of two sun gears fixed on adjacent ends of the axles.

The brake and clutch of the input shaft assembly and the speed range selector clutch of the second shaft sub-assembly are sufficient to provide for three forward speeds and reverse in one embodiment of the invention. But

2 where an additional forward speed is required as in the second embodiment of the invention, a brake is provided on the second shaft sub-assembly and a speed reducing gear train is interposed between the planetary sub-assembly and the differential sub-assembly.

In the drawings:

FIG. 6 is a developed view of a second embodiment of the present invention taken on the line 6—6 of FIG. 7, the second embodiment providing four forward speeds and reverse.

FIG. 7 is a side elevation of the structure shown in FIG. 6 to show the relationship in space of some of the shafts thereon.

FIG. 8 is a top plan view of a structure shown in FIG. 7 to show the relationships of others of the shafts therein.

FIG. 9 is a cross section taken on the line 9—9 of FIG. 6, and

FIG. 10 is a cross section taken on the line 10—10 of FIG. 6.

Figure 1:
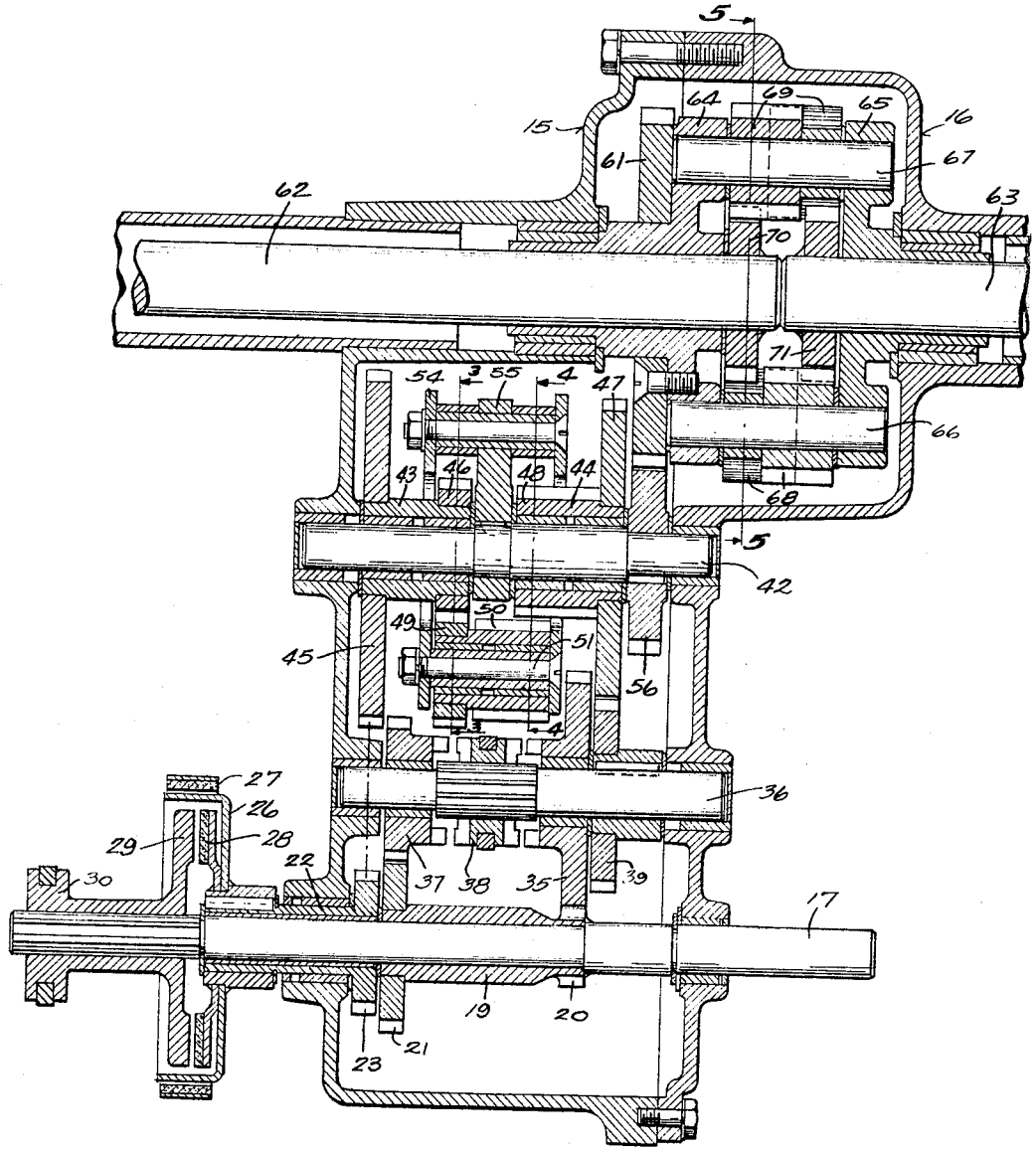
FIG. 1 is a developed view of a first embodiment of the present transmission-differential unit taken on the line 1—1 of FIG. 2, and which provides three forward speeds and reverse.
Figure 2:
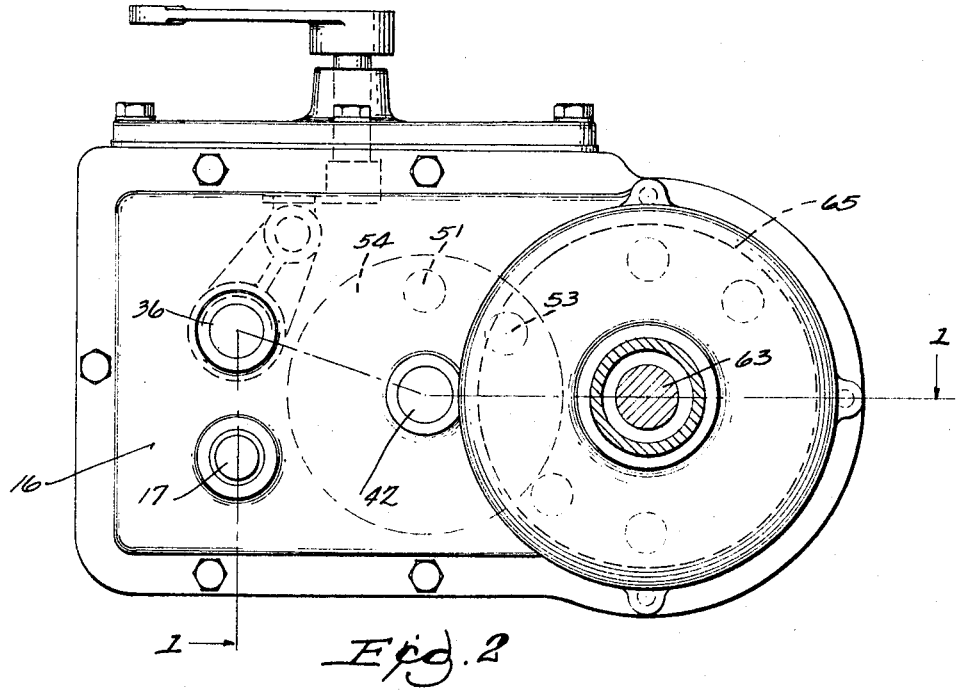
FIG. 2 is a side elevation of the unit of FIG. 1 to show the relationship in space of the various shafts, and to indicate means for clutching either of two gears to the shaft in the second sub-assembly.
Figure 3:
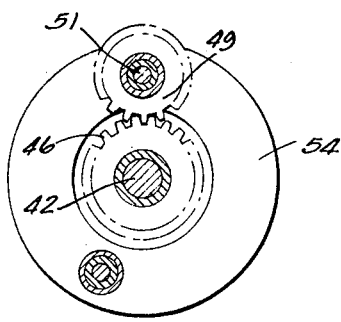
FIG. 3 is a cross section on the line 3—3 of FIG. 1.

Referring specifically to the drawings by reference numerals, 15 generally designates a casing having an open side and 16 generally designates a closure for the casing, which are each formed with holes in aligned pairs to receive rotating shafts (and axles) extending into and outwardly of the casing. Referring to FIGS. 1–5 which illustrate a first embodiment of the present invention power is delivered to the transmission-differential by input shaft 17. A sleeve 19 is fixed on the shaft 17 and has fixed thereto two gears 20 and 21, and a hub sleeve 22 is rotatable on the shaft 17 and has fixed thereto a gear 23. A brake drum 26 is fixed on portion of the sleeve 22 outside of the casing for engagement by a brake band 27. A clutch disk 28 is fixed on sleeve 22 adjacent the brake and a second clutch disk 29 is splined on the shaft 17 and has a shifter 30 connected thereto for movement of the clutch disk 29 into and out of engagement with the disk 28. Either the brake 26, 27 or the clutch 28–30 are engaged when the speed or the direction of rotation of the power output is to be changed. The above structure is herein called an input sub-assembly and may include additional input shafting and gearing as in the second embodiment disclosed.

Input gear 20 meshes with gear 35 of a change speed gear set sub-assembly which includes a jack shaft 36, and input gear 21 meshes with a gear 37 on shaft 36. The gears 20 and 35 constitute one gear pair and the gears 21 and 37 constitute another gear pair of differing ratio for selectively driving jack shaft 36 from input shaft 17. Both gears 35 and 37 are rotatable on the shaft 36 and are alternately clutched to the shaft by a jaw clutch 38 splined on the shaft. A third gear 39 constituting a driving gear is fixed on the shaft 36 and is driven by engagement of either gear 35 or gear 37. The clutch 38 is synchronized with the operation of brake 26, 27 and clutch 28, 29 and is effective in the present construction both in selection of the forward speeds and reverse.

A planetary speed changing sub-assembly includes a planetary jack shaft 42 rotatably supporting two sleeves 43 and 44, sleeves 43 having fixed thereto gear 45 and gear 46 while sleeve 44 has fixed thereto gear 47 and gear 48. Gears 45 and 47 are side gears and may be different in size and changes in speed are obtained dependent on whether one or both of the side gears act in the flow of power. Gears 46 and 48 are sun gears of planetary gearing including several pinion assemblies which rotate as planets in a carrier. One pinion assembly (FIG. 3) includes gear 49 and gear 50 on a planet shaft 51, gear 49 meshing with sun gear 46. Another planet assembly (see FIGS. 2 and 4) includes gear 52 on shaft 53, such gear meshing with the sun gear 48 and with planet gear 50. Planet carrier 55 is fixed to the shaft 42 so that the carrier rotates with such shaft. Shaft 42 also has a gear 56 thereon by which power is transmitted from the speed changing planetary sub-assembly to the differential final drive sub-assembly.

Figure 5:
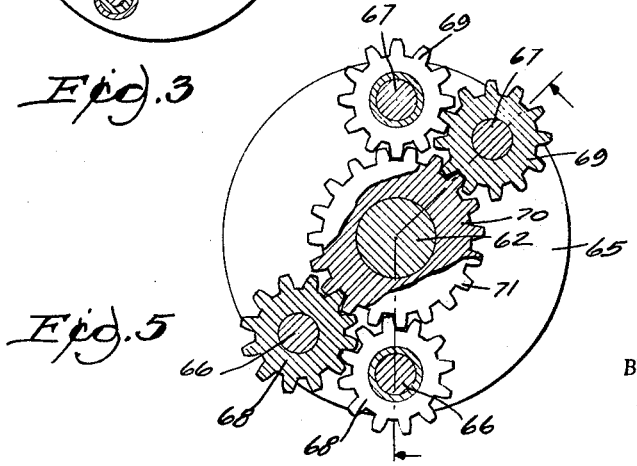
FIG. 5 is a cross section on the line 5—5 of FIG. 1.

The output gear 56 on the planetary speed change shaft 42, meshes with a gear 61 which delivers power to differential carrier gearing joining two power output axles 62 and 63. The differential carrier 64, 65 is journaled in the casing and rotatably supports two pairs of shafts 66 and 67 as indicated in FIG. 5. The two shafts 66 rotatably and severally carry planet gears 68 and the two shafts 67 rotatably and severally carry planet gears 69. Pairs of gears 68 and 69 respectively mesh with each other and one gear of each pair of gears meshes with one of two sun gears 70 or 71 respectively fixed to axles 62 and 63. The differential 61-71 operates in a well-known manner and no particular description of such operations is required.

The first embodiment has three speeds forward and one reverse and these speeds are obtained as follows:

The structure is in neutral position when range selector jaw clutch 38 is not engaged. If the range selector jaw clutch 38 is engaged, neutral may also be obtained by having both the brake 26, 27 and the clutch 28, 29 disengaged.

High speed is obtained by engaging the range selector jaw clutch 38 with gear 37 and applying brake 26, 27, which holds gear 23 and side gear 45 stationary and allows the power to flow through side gear 47 into the planetary sub-assembly and out through the carrier 55, shaft 42 and gear 56 to gear 61 of the final drive.

To shift from high to second speed, the brake 26, 27 is released and the clutch 28, 29 is engaged. The power then flows into the planetary through side gear 47, and power is returned to the input shaft 17 from side gear 45 meshing with gear 23 which is now clutched to input shaft 17.

To shift from second speed to low speed, the clutch 28, 29 is released and the range selector jaw clutch 38 is shifted to engage gear 35 and brake 26, 27 is applied. The side gear 45 is then held stationary and power flows via side gear 47 into the differential sub-assembly and through the carrier 55 through shaft 42 and gear 56 to the final drive gear 61.

To shift from low to reverse, brake 26, 27 is released and clutch 28, 29 is engaged and power then flows into the planetary from gear 23 to side gear 45, and power is returned to the input shaft 17 from side gear 47 meshing with gear 39, and from gear 35 meshing with gear 20 on input shaft 17.

Figure 4:
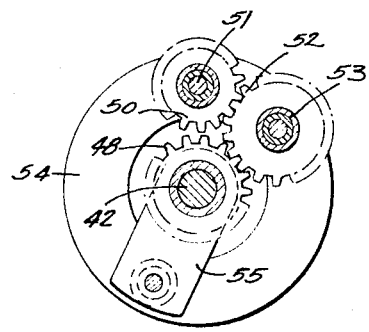
FIG. 4 is a cross section on the line 4—4 of FIG. 1.

The various gears of the present planetary speed changing differential unit are designed to provide power flow as indicated below. The speeds of both the several shafts and of the gears involved in each speed forward and reverse, are given so that the power flow paths may be followed. It is assumed that the speed of the input shaft 17 is 400 r.p.m. It will be remembered that the gear 23 meshes with the gear 45 as indicated by the dotted line in FIG. 1, that the gear 49 is connected by its shaft 51 to gear 50 which meshes through gear 53 with gear 48 as shown in FIG. 4, and that the speed changing planet carrier 54, 55 rotates with the shaft 42.

For low speed forward operation, the brake 26, 27 is engaged to hold the gear 23 stationary and the gear 35 is clutched to its shaft 36. Power flow is as follows and the parts operate at the speeds indicated:

| | R.p.m. |
|---|---|
| Input shaft 17 (gear 20) | 400 |
| Shaft 36 (gears 35 and 39) | 114 |
| Gear 47 | 70 |
| Shaft 42 (gear 56) | 35 |
| Axles 62, 63 (gear 61) | 18.3 |

For second speed forward, clutch 28, 29 is engaged to drive gear 23 at input speed and gear 37 is clutched to shaft 36. Power flows as follows at speeds indicated:

| | R.p.m. |
|---|---|
| Input shaft 17 (gear 21) | 400 |
| Gear 23 | 400 |
| Shaft 36 (gears 37 and 39) | 500 |
| Gear 45 | 152 |
| Gear 47 | 306 |
| Shaft 42 (gear 56) | 77 |
| Axles 62, 63 (gear 61) | 40 |

For high speed forward, brake 26, 27 is engaged to hold gear 23 stationary and gear 37 remains clutched to its shaft 36. Power flows as follows at speeds indicated:

| | R.p.m. |
|---|---|
| Input shaft 17 (gear 21) | 400 |
| Shaft 36 (gears 37, 39) | 500 |
| Gear 47 | 306 |
| Shaft 42 (gear 56) | 153 |
| Axles 62, 63 (gear 61) | 80 |

For reverse, clutch 28, 29 is engaged to rotate gear 23 at input speed and gear 35 is clutched to shaft 36. Power flows as follows at speeds indicated:

| | R.p.m. |
|---|---|
| Input shaft 17 (gear 20) | 400 |
| Gear 23 | 400 |
| Shaft 36 (gear 35, 39) | 114 |
| Gear 45 | 152 |
| Gear 47 | 70 |
| Shaft 42 (gear 56), rev. | 41 |
| Axles 62, 63 (gear 61), rev. | 21.5 |

It will be seen that both the second speed forward and reverse in the above unit, involve power flow through both side gears 45 and 47. Hence sun gear 46 is driven and pinion 49 is also in operation (as well as pinions 50 and 52 by which power is put on carrier 54).

FIGS. 6-10 illustrate a second embodiment of the invention which includes a number of sub-assemblies similar to those previously described plus an additional shaft and bevel gearing which comprise a right angle input shaft. One shaft of the input sub-assembly extends outside of the case and becomes a power take-off (PTO) shaft in this embodiment. By the addition of a brake mounted on the second sub-assembly shaft, another forward speed is obtained (giving four speeds forward and reverse). An additional shaft with a pair of gears is added to provide a greater speed reduction between the speed changer sub-assembly and the differential sub-assembly.

A casing 75 partially encloses the gearing and its open side has a cover 76, both the casing and cover having apertures in aligned pairs for rotatably receiving various shafts and to allow some shafts to enter or extend from the casing. Input shaft 77 ends in bevel gear 78 engaging bevel gear 79 which is fixed on the shaft 80 and gear 79 has a spur gear part 81 attached thereto. A gear 82 is also fixed on the shaft 80 and the gears 81 and 82 transmit power from the shaft 80 to the balance of the gearing. Gear 85 is rotatably mounted on the shaft 80 and has fixed thereto both the brake drum 86 which may be held stationary by brake band 87 and a clutch part 88 which may be engaged by a clutch part 89 splined on the shaft 80 and operable by a shifter 90 to clutch the gear 85 to the shaft. Both ends of the shaft 80 may extend outside of the casing for taking off power for auxiliary use.

A shaft 93 carries gear 94 engaged with gear 82 and a gear 95 engaged with gear 81 on the clutch-brake shaft 80 and gears 94 or 95 may be alternately clutched to the shaft 93 by the jaw clutch 96 splined to such shaft. A brake drum 97 is fixed on the shaft 93 and is engageable by brake band 98 to hold the shaft 93 stationary for some of the speed changing. The brake 97, 98 together with clutch 88, 89 being engaged, and jaw clutch 96 being disengaged or in a neutral position, function together to obtain reverse speed. Aside from brake 97, 98, it will be seen that the second sub-assembly is similar to that of FIGS. 1–5. Brake 86, 87 and clutch 88, 89 together with jaw clutch 96 are used in securing the four forward speeds obtained in the second embodiment.

Gear 99 on shaft 93 transmits motion of such shaft to gear 108 which is a side gear of a planetary speed changing sub-assembly which includes a shaft 102 rotatably supporting sleeve 103 on which is fixed a gear 104 meshing with the gear 85 and a gear 105 which is one of the sun gears of the planetary speed changing sub-assembly. Another sleeve 107 is also rotatable on the shaft 102 and has fixed thereon a gear 108 meshing with the gear 99 and with a sun gear 109 of the planetary speed changing sub-assembly. A carrier 112 is formed by two annular plates joined by several planetary gear assemblies as described below. The planet assemblies (see FIGS. 9 and 10) include one pair of planets each comprising a shaft 113 rotatable in the carrier and a sleeve 114 rotatable on such shaft and a gear 115 rotatable with the sleeve. Another pair of planets comprises rotatable shafts 116 with a sleeve 117 rotatable thereon and having gears 118 and 119 secured thereon. Planet gear 115 meshes with sun gear 105 and planet gears 118 and 119 mesh respectively with sun gears 105 and 109. Another pair of shafts 122 are fixed to the carrier and have attached thereto bar 124 which is fixed to the shaft 102 so that the carrier rotates with such shaft. The shaft 102 also has fixed thereon a gear 125 which forms one part of a speed reducing gearing. It will be seen that this power train differs principally from the first embodiment, in providing small gear 125 which forms a part of a speed reducing gearing train not found in the first embodiment.

A shaft 128 has fixed thereon both gear 129 meshing with gear 125 and gear 130 delivering power to the differential sub-assembly, through gear 135. The gears 125 and 130 are relatively small in size and the gear 129 and 135 are relatively large so that considerable speed reduction takes place in this gear train.

Gear 130 delivers power to spur gear 135 attached to differential sub-assembly which includes the planetary acting parts and differential carrier and flange 137. Each of the planets includes a shaft 141 rotatable in the carrier and flange 137, a pinion gear 142 rotatable on shaft 141 and a spacer 143 to position the gear 142 on this shaft. At least two planetary assemblies are provided in the differential so that the gear 142 of one planetary assembly meshes with one or the other of the sun gears 146 or 147 respectively fixed on the axles 136 and 138. The differentials in the two embodiments differ only in sizes of various gears.

In the second embodiment, four forward speeds and reverse are obtained and the shifting is done by use of brakes and clutches plus one additional brake. In this embodiment reverse is obtained by having the range selector jaw clutch 96 disengaged and clutch 88, 89 is engaged so that power flows into the speed changing sub-assembly by means of gears 85 and 104. The other speed changer side gear 108 now is held stationary by applying brake 98 to brake drum 97 which is attached to shaft 93 and gear 99. Therefore, the power flows into the planetary speed changing sub-assembly, through side gear 104 and out through the carrier 112 to shaft 102, and gear 125, meshing with gear 129 on shaft 128, and gear 130 meshing with differential gear 135. Brake drum 150 on the shaft 102 and its brake band 151, are the means for stopping and holding the vehicle stationary and have no effect whatever in the transmission of power.

In the present embodiment it is assumed that the input shaft 77 operates at 1,000 r.p.m. and that bevel gears 78 and 79 reduce the speed to 485 r.p.m. on shaft 80. Different speeds forward are obtained by the use of the brakes 86, 87 or the clutch 88, 89, the clutch 96 being previously shifted to pick a particular speed range while reverse requires use of clutch 88, 89 and brake 97, 98. For low speed operation, clutch 96 is moved to engage gear 94 and clutch 88, 89 is engaged to connect the gear 85 to the shaft 80. Two paths of power flow are then in use to the speed changing gearing, as follows:

|  | R.p.m. |
| --- | --- |
| Shaft 80 (gear 82) | 485 |
| Shaft 93 (gears 94, 99) | 242 |
| Gear 108 | 295 |
| Shaft 80 (gear 85) | 485 |
| Gear 104 | 169 |
| Shaft 102 (gear 125) | 64 |
| Shaft 128 (gears 129, 130) | 20 |
| Axles 136, 138 (gear 135) | 4.8 |

For second speed, clutch 96 remains engaged with gear 94 and brake 86, 87 is engaged to hold gear 85 stationary. Power flow then includes:

|  | R.p.m. |
| --- | --- |
| Shaft 80 (gear 82) | 485 |
| Shaft 93 (gears 94, 99) | 242 |
| Gear 108 | 295 |
| Shaft 102 (gear 125) | 149 |
| Shaft 128 (gears 129, 130) | 47 |
| Axles 136, 138 (gear 135) | 11.2 |

For third speed, clutch 96 is shifted to engage gear 95 and clutch 88, 89 is engaged to connect gear 85 to its shaft 80. Power flow then includes:

|  | R.p.m. |
| --- | --- |
| Shaft 80 (gear 81) | 485 |
| Shaft 93 (gear 95, 99) | 570 |
| Gear 108 | 690 |
| Shaft 80 (gear 85) | 485 |
| Gear 104 | 169 |
| Shaft 102 (gear 125) | 262 |
| Shaft 128 (gear 129, 130) | 83 |
| Axles 136, 138 (gear 135) | 19.7 |

For high speed, clutch 96 remains shifted to engage gear 95 and brake 86, 87 is engaged to hold gear 85 stationary. Power flow then includes:

|  | R.p.m. |
| --- | --- |
| Shaft 80 (gear 81) | 485 |
| Shaft 93 (gear 95, 99) | 570 |
| Gear 108 | 690 |
| Shaft 102 (gear 125) | 350 |
| Shaft 128 (gear 129, 130) | 111 |
| Axles 136, 138 (gear 135) | 26.2 |

For reverse speed, clutch 96 remains in neutral, clutch 88, 89 is engaged to drive gear 85 at the speed of shaft 80 and brake 97, 98 is engaged to hold shaft 93 stationary. Power flow then includes:

|  | R.p.m. |
| --- | --- |
| Shaft 80 (gear 85) | 485 |
| Gear 104 | 169 |
| Shaft 102 (gear 125), rev. | 84 |
| Shaft 128 (gear 129, 130), rev. | 26 |
| Axles 136, 138 (gear 135), rev. | 6.3 |

It will be seen that each of the two embodiments herein disclosed, provides a power input assembly which may include the actual power input shaft and which includes plural gears fixed on the shaft with one of the gears rotatable relative thereto. The relatively rotatable gear may be held against such rotation by a brake acting from a stationary part adjacent the shaft or may be connected with the shaft by a clutch splined on the shaft. The gears fixed on the shaft mesh with gears which are rotatably mounted on a shaft of a second sub-assembly. The relatively rotatable second sub-assembly gears are alternately engaged by the clutch on the second sub-assembly shaft and a gear fixed on such shaft transmits power therefrom. In the second embodiment of the invention a brake is provided by which a second sub-assembly gear (and a side gear of the planetary speed changer) may be held stationary when it is desired to reverse the power output in the second embodiment.

A planetary speed changing sub-assembly is provided in which a carrier is fixed to the shaft and contains planet gears meshing with sun gears severally mounted on sleeves with side gears affixed thereto. The side gears are respectively meshed with input sub-assembly gears. The forward power flow is from the input shaft to the secondary shaft with a clutch for obtaining either high or low range of forward speeds through the right hand side gear into the speed changing sub-assembly. In each range of speed two separate speeds are obtained either by applying a brake to hold stationary the left hand side gear, or by engaging the clutch and having the power flow through both side gears. Reverse speed is obtained by having the power flow through the left hand side gear and holding the right side gear stationary by means of a brake on the second sub-assembly shaft.

A differential sub-assembly is driven directly by the planetary speed change sub-assembly in the first embodiment whereas, in the second embodiment, a speed reducing train of gearing is interposed between the speed change sub-assembly and the differential sub-assembly. In each case, the differential sub-assembly is planetary in structure with a sun gear fixed on each axle of a pair of drive wheels. Flange-like members are severally rotatably mounted on each axle and are joined by planetary gears severally meshing with the sun gears. A gear fixed to one of the flanges is the driven gear and transmits power to the differential planetary carrier.

I claim:

1. In a transaxle, the combination with an input shaft and a pair of output axle shafts, of means for transmitting motion at different speed ratios from the input shaft to the output shafts, said means comprising
   a differential mechanism for driving the output axle shafts and including sun gears on said shafts, planet gears meshing with the sun gears, a differential carrier upon which the planet gears are mounted, and a carrier gear connected with the carrier,
   a planetary transmission for driving the differential mechanism and including a planetary jack shaft having a gear in mesh with the driving gear of said differential mechanism, a carrier fixed to the jack shaft, planet gears rotatably supported on the carrier, sun gears rotatable with respect to the jack shaft and meshing with the planet gears, and
   a change speed gear set comprising a change speed jack shaft, gear pairs for respectively driving the sun gears of the planetary transmission, one of said gear pairs having a driving gear on the change speed jack shaft, an input shaft on which the driving gear of the other pair is rotatably mounted, means for selectively braking said last mentioned driving gear and alternatively clutching it to the said input shaft, input shaft gear pairs of differing ratio including driving gears fixed to the input shaft and driven gears rotatably mounted on the change speed jack shaft and with which the driving gears on the input shaft mesh, and means for selectively clutching the change speed jack shaft to the last said driven gears rotatably mounted thereon.

2. In a transaxle, the combination with an input shaft and output axle shaft means, of means for transmitting motion at different speed ratios from the input shaft to the output shaft means, said motion transmitting means comprising
   a driving gear for driving the output axle shaft means and
   means for transmitting motion to the driving gear of said axle shaft means and comprising
   a planetary transmission including a planetary jack shaft and a carrier fast on the jack shaft, planet gears on the transmission carrier, sun gears rotatably mounted on the jack shaft and with which said planet gears mesh,
   a change speed gear set comprising a change speed jack shaft, gear pairs of differing ratio and including a driven gear in each pair connected for respectively driving one of the sun gears of the planetary transmission, one of said gear pairs having a driving gear on the change speed jack shaft, an input shaft on which the driving gear of the other pair is rotatably mounted, means for selectively braking said last mentioned driving gear and for alternatively clutching it to the said input shaft, input shaft gear pairs of differing ratio including driving gears on the input shaft and driven gears on the change speed jack shaft and with which the driving gears on the input shaft mesh, corresponding gears of the said respective pairs of gears being freely rotatable on the shaft upon which they are mounted except as clutched thereto, and means for selectively clutching the freely rotatable gears of said pairs to the shaft upon which they are mounted.

3. In a transaxle, the combination with an input shaft, of
   speed change driving gears of differing ratio mounted thereon, a speed change jack shaft having driven gears rotatable thereon and meshing with respective driving gears aforesaid, clutch means for selectively coupling the driven gears with the jack shaft, an intermediate motion-delivering gear on the jack shaft,
   a planetary transmission having an output shaft, a planet carrier fixed to the output shaft, planet gears on the carrier, sun gears rotatable coaxially with the output shaft, a motion-receiving gear connected with a sun gear and meshing with the motion-delivering gear on the speed change jack shaft, means for selectively braking the other said sun gear and for alternatively drivingly connecting the input shaft thereto, axle shaft means, and
   means for driving the axle shaft means from the said output shaft of the planetary transmission.

4. A transaxle according to claim 3 in which the said means for selectively braking and alternatively driving the other said sun gear from the input shaft comprises
   meshing gears, one of which is connected with the said other sun gear and the other of which has a hub sleeve rotatable on the input shaft, brake means and clutch means on the hub sleeve, a brake operatively engageable with the said brake means, and a clutch on the input shaft operatively engageable with the clutch means on said sleeve.

5. A transaxle according to claim 4 in which the axle shaft means comprises coaxial axle shafts, and the means for driving the shaft means comprises a differential gear set operatively connected with said shafts and having a driving gear with which meshes a gear on the output shaft of the said planetary transmission.

6. A transaxle according to claim 3 in which the speed change drive shaft is provided with selectively operable brake means and the planetary transmission output shaft has brake means for selectively acting thereon.

7. A transaxle according to claim 3 in which the means for driving the axle shaft means from the output shaft of the planetary transmission comprises reduction gearing having a reduction gear shaft, a gear pair including a driving gear on the planetary output shaft and a driven gear on the reduction gear jack shaft, and another gear pair including a driving gear on the reduction gear jack shaft and a driven gear which is mounted on a differential planet gear carrier of a differential with which the axle shaft means is provided.

References Cited by the Examiner

UNITED STATES PATENTS

| 2,871,726 | 2/1959 | Kamlukin | 74—674 X |
| 2,885,907 | 5/1959 | Glamann | 74—674 X |
| 3,106,855 | 10/1963 | Reichenbaecher | 74—674 X |
| 3,128,662 | 6/1964 | Obenshein | 74—674 X |

DAVID J. WILLIAMOWSKY, *Primary Examiner.*

J. R. BENEFIEL, *Assistant Examiner.*